UNITED STATES PATENT OFFICE 2,539,187

HIGH-SULFUR CARBONACEOUS COMPOSITIONS

Bernard W. Gamson, Morton Grove, Ill., assignor to Great Lakes Carbon Corporation, Morton Grove, Ill., a corporation of Delaware No Drawing. Application April 16, 1948, Serial No. 21,560

5 Claims. (Cl. 260—139)

This invention relates to a carbonaceous composition comprising essentially carbon, hydrogen and high percentages of sulfur.

More particularly it relates to a solid, black, infusible, insoluble, dense composition and method for making it, comprising carbon, hydrogen and sulfur in chemical combination. The compositions are useful for preparing carbon disulfide, sulfochlorocarbons, or similar derivatives of other halogens; for the compounding of rubber; as supports for catalysts, particularly those not poisoned by sulfur, and for many other purposes.

In a broad embodiment the invention comprises heating sulfohydrocarbons or sulfocarbons such as are described in copending application 649,730, filed February 23, 1946, now U. S. Patent No. 2,447,004 issued August 17, 1948, with sulfur vapor below the temperature at which carbon disulfide is formed, in the range of about 700° F. to 1100° F. to chemically combine additional sulfur therewith.

In a specific embodiment the invention comprises forming a hard insoluble, infusible, dense, black, amorphous carbonaceous composition of chemically combined sulfur, carbon and hydrogen by heating a uniform mixture of sulfur and a hydrocarbonaceous substance at 300–450° F., then heating at a temperature of 450–625° F. to produce a solid infusible mass, heating the mixture to about 600–1400° F. to drive off hydrogen sulfide and then heating in the presence of sulful vapor at a temperature of about 700° F. to 1100° F., at which no substantial production of carbon disulfide occurs.

The raw materials for this process are prepared in the following manner.

A hydrocarbonaceous material preferably boiling above about 350° F., and liquid in the range of 300–450° F. is mixed with elemental sulfur amounting to at least 60% of the stoichiometrical equivalent of the hydrogen content to form a uniform mixture. About 90% to about 110% stoichiometrical sulfur to hydrogen is especially advantageous. Heavy petroleum fuel oils or residues, asphalts, pitch, tar, etc., having from about 4 to about 12% hydrogen content are especially suitable.

The sulfur and hydrocarbon should be mixed and heated to form a uniform mixture. Hydrogen sulfide is evolved. The mixture is heated at 450–625° F. to form a solid, black, infusible, insoluble dense, hard composition in which the sulfur is combined with the carbon and hydrogen, and the composition is amorphous.

The composition, identified as a sulfohydrocarbon, is as follows:

Carbon about 47 to about 70%
Hydrogen about 4.0 to about 1.8%
Sulfur about 50 to about 25%
Ash about nil to about 2.5% and has a real density from about 1.3 to about 1.7.

When heated above about 1100° F. and preferably not above about 1400° F. and in any event not above 1800° F., the resulting composition identified as a sulfocarbon, is amorphous and has the following analysis.

Carbon about 70% to about 93%
Hydrogen about 1.8% to about 0.3%
Sulfur about 25% to about 6%
Ash about 0.1% to about 2.5% and has a real density from about 1.5 to about 1.9.

The solid substances thus produced are heated in the presence of sulfur vapor which may be passed continuously through or over particles or lumps thereof. The lumps or granules may be passed continuously through a reaction zone in the form of a downwardly moving bed. The sulfur vapors with or without an inert gaseous diluent may be passed countercurrent or concurrent to the bed; the time, concentration of sulfur vapor and temperature being adjusted to produce the desired product. Generally an excess of sulfur is used over that which will combine, hence at the outlet of the reaction zone, some sulfur vapor is removed, recovered and recycled. Other suitable methods include treating the particles in a packed tower in batch operation; or in a rotating kiln; or in the socalled fluidized reactor wherein relatively fine granules or powder of the materials are maintained in ebullient condition by the sulfur vapors.

The temperature is usually at or above the boiling point of sulfur, at least sufficient to prevent the sulfur vapors from condensing. If lower temperatures are desired, the sulfur vapor can be diluted with an inert gas such as hydrogen sulfide, nitrogen or mixtures to lower the dew point of the sulfur vapor. The gas should not react with the sulfur or sulfur compounds of which the carbonaceous material is composed.

The temperature must be below that at which substantial formation of carbon disulfide takes place. It should at all times be below 1100° F. Otherwise the sulfur reacts to form carbon disulfide and does not go into combination with the sulfohydrocarbon or sulfocarbon.

By this method the chemically combined sulfur content of the compositions can be substantially increased. It is the only way known by which this can be done. Variation in proportions of sulfur in the formative stages of the solid sulfur-carbon-hydrogen substances results in variation in sulfur content within the composition limits above tabulated, but compositions of the same sulfur content made by the two methods differ markedly in their properties. The compositions of the present invention are more reactive for example for making carbon disulfide, and generally more dense. Subsequent activation with steam or carbon dioxide results in a more active carbon from the standpoint of decolorization or gas absorption than is obtained from such treatment of the sulfo-carbon or sulfohydrocarbons themselves.

The initial heating stages are accompanied by evolution of hydrogen sulfide, which continues to be evolved to some extent during sulfurization. This can be separated, oxidized to elemental sulfur, recovered and recycled.

The sulfocarbonaceous solid prior to sulfurization, may be heated, preferably in an inert atmosphere, to a temperature about as high as, or slightly above that at which sulfurization is carried out to yield the products of this invention. Much of the hydrogen content as sulfide may first be driven off in this way, hence less hydrogen sulfide will be evolved during the sulfurizing treatment.

The sulfurizing treatment of sulfohydrocarbons or sulfocarbons increases the combined sulfur content, decreases the proportion of hydrogen to carbon, and increases the density. The following example illustrates the invention but should not be interpreted as limiting it to the exact conditions shown.

A cracked petroleum residue having 8.7% hydrogen, was mixed with elemental sulfur in proportions stoichiometrically equivalent to the hydrogen content, heated at 300° F. to form a uniform liquid and was then injected into a reaction zone heated at about 600° F. to form discrete particles. Hydrogen sulfide was evolved. The resulting material was a hard, black, infusible substance. It was heated at the temperatures shown in the table below, and sulfur vapor passed over the particles at 1000° F. for one hour. Analyses before and after this treatment are shown. The table shows that a marked increase in sulfur content occurs, especially in the samples calcined at the lower temperatures. This sulfur was substantially completely in chemical combination as shown by the fact that heating did not cause evolution of free sulfur, and further it could not be dissolved out by carbon disulfide.

| Calcining Temp., °F | 1,000 | | 1,150 | | 1,400 | |
|---|---|---|---|---|---|---|
| | No. S. | S. Treat. | No. S. | S. Treat. | No. S. | S. Tr. |
| Carbon_____per cent__ | 74.1 | 57.5 | 78.3 | 73.7 | 84.4 | 81.1 |
| Hydrogen_____do____ | 1.7 | 0.9 | 1.46 | 0.9 | 1.06 | 0.8 |
| Sulfur_____do____ | 24.2 | 41.6 | 20.34 | 25.4 | 14.54 | 18.1 |
| Density_____ | | | | | | |

The results of sulfur treatments shown in this table were all made at 1000° C., the other temperatures noted were calcining temperatures made prior to the sulfurizing treatment.

Reactivity tests on the sulfur treated samples for producing carbon disulfide, showed increased reactivity over that of the corresponding samples not treated with sulfur.

Preliminary calcination at temperatures above about 1450° F. resulted in compositions to which sulfur vapor did not add to a substantial extent nor was the reactivity for $CS_2$ production substantially improved by the present sulfurization treatment. The calcining temperature prior to sulfurization, as well as the temperature of sulfurization is critical.

The new sulfur treated products have the following composition calculated on an ash free basis.

Carbon about 45–70%
Hydrogen about 0.5–1%
Sulfur about 55–18%

I claim as my invention:

1. A process for manufacturing a solid, hard, black, amorphous, dense infusible, insoluble sulfur-carbon-hydrogen composition which comprises calcining a sulfohydrocarbon at a temperature below 1450° F. and above the boiling point of sulfur then contacting the calcined composition with sulfur vapors at a temperature below 1100° F. whereby additional sulfur combines with the said calcined sulfohydrocarbon.

2. A process for making a solid, hard, black, amorphous, dense infusible, insoluble sulfur-carbon-hydrogen composition which comprises calcining a sulfohydrocarbon at 450° to about 1450° F., contacting the calcined residue with sulfur vapor at a temperature below 1100° F. and at which carbon disulfide does not form, thereby increasing the combined sulfur content of said composition and increasing its reactivity.

3. A process for making a solid, hard, black, amorphous, dense infusible, insoluble sulfur-carbon-hydrogen composition which comprises forming a uniform mixture of a hydrocarbonaceous substance having a hydrogen content of about 4 to about 12% and being liquid in the range of about 300–500° F. with elemental sulfur in proportions of at least 60% the stoichiometrical equivalent of the hydrocarbonaceous substance, heating the mixture at a temperature in the range of about 450–1450° F. thereby partially dehydrogenating the substance by removal of hydrogen as hydrogen sulfide to produce an amorphous solid having a real density of about 1.3 to about 1.9 containing carbon from about 47% to about 93%, hydrogen about 0.3% to about 4%, and sulfur about 6% to about 50%, said sulfur being chemically combined with the carbon and hydrogen then heating the material with sulfur vapor above about 700° F. but below 1100° F. thereby increasing the combined sulfur content of said composition.

4. The process of claim 3 wherein the hydrocarbonaceous substance is a petroleum residue.

5. The process of claim 3 wherein the hydrocarbonaceous substance has a hydrogen content of about 4 to about 12%.

BERNARD WM. GAMSON.

REFERENCES CITED

The following references are of record in the file of this patent:

UNITED STATES PATENTS

| Number | Name | Date |
|---|---|---|
| 2,447,004 | Gamson | Aug. 17, 1948 |
| 2,447,005 | Gamson | Aug. 17, 1948 |
| 2,447,006 | Gamson | Aug. 17, 1948 |